April 10, 1956 A. H. MIRAU 2,741,151
APPARATUS FOR MEASURING THE ROUGHNESS OF SURFACES
Filed Feb. 17, 1955
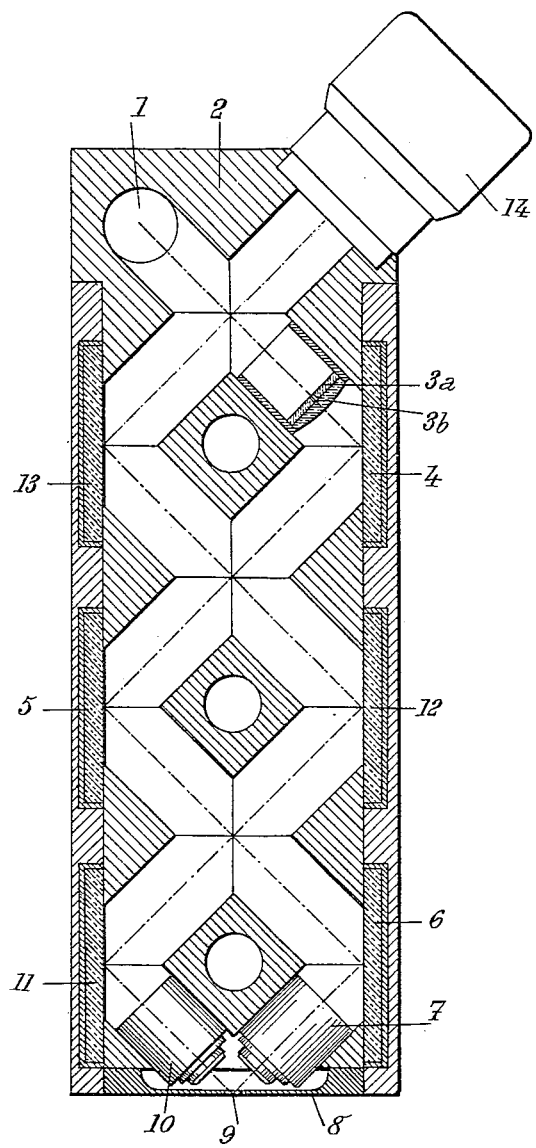
INVENTOR
ANDRÉ HENRI MIRAU
BY Larson and Whiting
ATTORNEY

United States Patent Office 2,741,151
Patented Apr. 10, 1956

2,741,151

APPARATUS FOR MEASURING THE ROUGHNESS OF SURFACES

André Henri Mirau, Paris, France, assignor to the Company "La Precision Mecanique," Paris, France, a French society Application February 17, 1955, Serial No. 488,951

Claims priority, application France March 12, 1954

1 Claim. (Cl. 88—14)

The present invention relates to optical apparatus for measuring the roughness of surfaces by illuminating a band of said surfaces with a light beam inclined to said surfaces and observing this illuminated band from an opposed direction by means of a microscope.

With such an apparatus the principle of which has been known for a long time, any roughness on the surface that is observed is made apparent by the fact that the illuminated band observed through the microscope is no longer straight but is somewhat crooked and the irregularities in this band make it possible to appreciate the degree of roughness of the surface.

The apparatus existing at the present time therefore requires an optical device for projecting a light beam onto the surface to be observed and a microscope symmetrically located on the other side of said light projecting means for observing the illuminated band. Such an arrangement occupies a considerable volume and is therefore costly, delicate in its operation and difficult to handle.

The object of the present invention is to provide an apparatus of this kind which is of lower cost and better adapted to meet the requirements of practice than said prior apparatus.

For this purpose, according to my invention, the apparatus includes a single block provided with crossed paths for the light beams, whereby the light rays for illumination and for observation cross each other after reflection on suitable mirrors.

A preferred embodiment of my invention will be hereinafter described with reference to the accompanying drawing given merely by way of example and which is a vertical section of an apparatus for measuring the roughness of a surface.

The apparatus includes a single block 2 provided with holes for the passage of light rays. A light source 1 constituted for instance by an electric lamp sends light rays onto a system including a slotted screen 3a and a light condenser 3b. The slotted screen is for instance constituted by a photograph of a light slit on a black background made by means of an emulsion having very fine grains. The screen may also be constituted by a diaphragm limited along a diameter of the light condenser by a rectilinear edge. The light beam that has passed through said slit 3a is reflected on mirrors 4, 5 and 6 and finally reaches objective 7. This objective forms a luminous image of the straight line formed by the slit or edge of the diaphragm in the plane of the outer face of a partition 8 closing the apparatus at the bottom thereof. This partition is provided with a hole 9 so that the luminous image of the slit can be formed exactly in the plane of the outer face of said partition 8. The apparatus rests upon the surface to be observed so that this surface is located exactly in said plane, where the image of the above mentioned straight line is formed. The illuminated band thus formed on the surface to be observed is then observed through an objective 10 and, after reflection on mirrors 11, 12 and 13, an eyepiece 14. If the surface observed through hole 9 is perfectly smooth, the above mentioned line observed through said eye-piece is also quite straight. But if the surface is rough, the image observed through the eye-piece is more or less distorted.

Eye-piece 14 is provided with a micrometer forming for instance a multiplicity of parallel lines located at distances corresponding to 10 microns on the surface to be observed. It is therefore possible, by comparing the unequalities visible through the eye-piece with this network of parallel lines, to appreciate the degree of roughness of the surface in observation.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claim.

What I claim is:

An apparatus for observing the roughness of a surface which comprises a block provided with two zigzag passages crossing each other at right angles and disposed at 45° to the end faces of said block, side plates applied on the side faces of said block, mirrors carried by said side plates to form in said zigzag passages reflecting walls at 45° to the straight element of said zigzag passages, two objectives located in the passages at the bottom of said block, a source of light at the top end of one of said zigzag passages, an eye-piece provided at the top end of the other zigzag passage, a straight edge screen and a lens in the top element of the zagzag passage containing said source of light to said surface, and a partition at the bottom of said block provided with a hole, said two objectives being focussed on the middle point of said hole located in the plane of the outer face of said last mentioned partition.

No references cited.